United States Patent [19]

Ormsby

[11] 4,023,416
[45] May 17, 1977

[54] GAUGE MEANS FOR FLUID HANDLING APPARATUS

[75] Inventor: George S. Ormsby, Houston, Tex.

[73] Assignee: Picenco International, Inc., Houston, Tex.

[22] Filed: Nov. 24, 1975

[21] Appl. No.: 634,362

[52] U.S. Cl. .......................... 73/419; 116/114 PV; 116/129 R

[51] Int. Cl.² .......................................... G01L 7/16

[58] Field of Search ................ 73/432 R, 419, 393, 73/388 R, 565, 557; 116/129 R, 133, 114 PV; 137/565, 557

[56] References Cited

UNITED STATES PATENTS

| 1,506,943 | 9/1924 | Reed | 73/393 |
|---|---|---|---|
| 1,584,860 | 5/1926 | Huff | 73/393 |
| 1,846,705 | 2/1932 | Beck | 73/393 |

Primary Examiner—Donald O. Woodiel
Attorney, Agent, or Firm—Browning, Bushman & Zamecki

[57] ABSTRACT

A gauge means according to the present invention comprises a gauge face and indicator means disposed adjacent the face, at least a part of the indicator means extending along the face in a first direction, and at least a part of the indicator means being movable along the face in a second direction generally transverse to the first. A first scale comprises a first series of indicia marks progressing longitudinally along the extending part of the indicator. Each mark of the first series corresponds to a given value of a first parameter. A second scale comprises a second series of indicia lines each of which extends along the face angularly with respect to the first and second directions. Each line of the second series corresponds to a given value of a second parameter. The movement of the movable part of the indicator means is responsive to a third parameter. The first, second, and third parameters are functionally related. The gauge means may be associated with a fluid handling apparatus containing a fluid having a fluid head. One of the first two parameters is a function of the density of the fluid and the other is a function of the fluid head. The third parameter is the pressure of the fluid, and the movable part of the indicator means is operably exposed to this pressure.

17 Claims, 6 Drawing Figures

GAUGE MEANS FOR FLUID HANDLING APPARATUS

BACKGROUND OF THE INVENTION

1. Field of the Invention

The present invention pertains to a unique gauge means which is particularly useful in connection with fluid handling apparatus containing fluid having a fluid head. For example, a centrifugal pump generates a dynamic fluid head. A pressurized pipe carrying a liquid also has a fluid head of the hydrostatic type. In any case, the fluid head is functionally related to the density of the fluid and the pressure in the system. The gauge means of the present invention provides a convenient and reliable means of relating three such parameters as fluid head, fluid density, and pressure.

2. Description of the Prior Art

In systems involving three functionally related parameters, such as those listed above, it is often necessary or at least desirable to determine one of the three when the other two are known. In particular, in systems involving pumps, it is often necessary to determine the fluid head. However, since it is difficult to measure this head directly, fluid density and pressure are measured and the head is then calculated using suitable formulae and/or tables. This is time consuming and often difficult for a worker attending the system. Furthermore, errors are often made by the person making the calculations, using the tables, etc.

Another problem frequently experienced in applications in which the three parameters are fluid head, fluid density, and pressure is that workers tend to misunderstand the relationship between the three factors and the nature of the steps which should or should not be taken to place and keep the system in proper working order. In particular, where a pump is being used to direct a fluid from one location to another and thereby generating a fluid head, it is desirable to adjust the pressure and/or density of the fluid until the head reaches a predetermined optimum value. The head should then be kept at this value. As mentioned above, however, fluid head is not ordinarily measured directly. Rather the pressure of the fluid is measured. When the worker sees from the pressure gauge that there has been a change in pressure, he often erroneously assumes that optimum conditions have been lost and attempts to restore the system to its original state by making some change. However, it is often the case that the pressure change which the worker has detected is due to a change in the density of the fluid and that the head has remained constant. If this is the case, he will harm rather than improve the system by making changes aimed at restoring the pressure to its original value.

Thus, there is need not only for a means of determining the value of a parameter such as fluid head without the necessity for consulting tables, making calculations, etc., but also for a means of eliminating common systems operational errors due to misconceptions regarding the nature of the relationship between parameters.

SUMMARY OF THE INVENTION

The present invention comprises a gauge means including a gauge face, an indicator means disposed adjacent the face, and first and second scales. At least a part of the indicator means extends along the gauge face in a first direction, and at least a part of the indicator means is movable along the gauge face in a second direction transverse to the first. The indicator means may comprise an elongate movable member such that the indicator means as a whole extends along the gauge face and also moves therealong, i.e. the extending and movable parts may be one and the same. The first scale comprises a first series of indicia marks progressing longitudinally along the extending part of the indicator means. The second scale comprises a second series of indicia lines each of which extends along the face angularly with respect to the first and second directions. Each mark of the first series corresponds to a given value of a first parameter. Each line of the second series corresponds to a given value of a second parameter. The movement of the movable part of the indicator means is responsive to a third parameter. The first, second and third parameters are functionally related.

Thus, if the current value of the first parameter is known, the second can easily be determined by noting the point at which the indicator means intersects the representation for the value of the first parameter on the first scale. The value of the second parameter is then read from the second scale for that point.

The unique gauge means may be associated with fluid handling apparatus containing a fluid having a fluid head. One of the first two parameters is a function of the density of the fluid, and the other is a function of the fluid head. The third parameter is the fluid pressure, the movable part of the indicator means being operably exposed to this pressure.

The system provides the workers with a faster and more direct way of determining the fluid head as it can be read from a scale cooperative with the pressure sensitive indicator means. Thus there is less likelihood of computational errors. Furthermore, the provision of a more direct means of reading fluid head values, together with simple instructions advising the worker to adjust the system only in accord with the head value, helps to eliminate misconceptions regarding the relationship of the parameters and consequent erroneous adjustments to the system. Indeed, by eliminating pressure value markings from the gauge, or by providing only a minimal number of pressure values as checkpoints, such errors can be made virtually impossible by forcing the workers to refer only to the fluid head values.

It is thus a principal object of the present invention to provide a novel gauge means relating three functionally related parameters.

Another object of the invention is to provide such a gauge means relating fluid density, fluid head, and fluid pressure in a fluid handling apparatus.

Still another object of the invention is to provide a quick and simple means of determining fluid head in a fluid handling system.

A further object of the invention is to provide a means of eliminating misconceptions regarding the relationship between fluid head, fluid density, and fluid pressure in a fluid handling system thereby eliminating improper system adjustments.

Other objects, features, and advantages of the present invention will be made apparent by the following detailed description of the preferred embodiments, the drawings and the claims.

DESCRIPTION OF THE PREFERRED EMBODIMENTS

Figure 1:
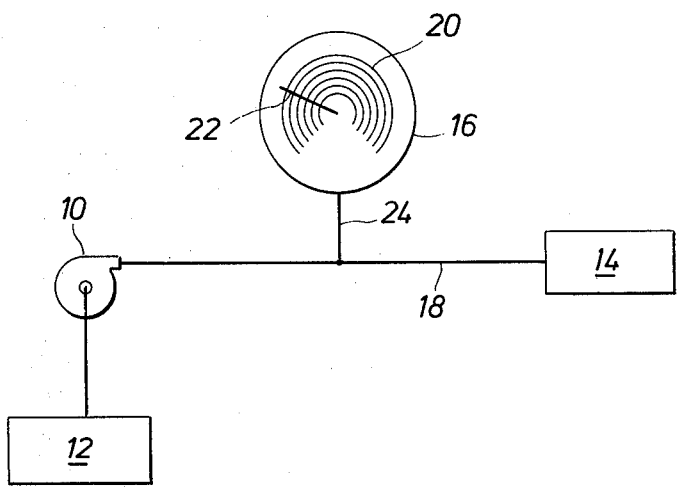
FIG. 1 is a diagrammatic illustration of a typical fluid handling system including gauge means according to the invention.

Referring now to FIG. 1 there is shown a fluid handling system in which a centrifugal pump 10 is used to pump a liquid from a first vessel, diagrammatically indicated at 12, to a second vessel, indicated at 14. For example, the fluid may be a drilling mud, vessel 12 a mud tank in the active mud system, and vessel 14 a hydrocyclone. In this process, a fluid head is generated, and the fluid head results in a pressure which is dependent on the density of the liquid being pumped. Thus the fluid head, fluid density, and pressure are mathematically functionally related. A gauge 16 adjoins the line 18 through which the liquid flows from the pump outlet to the location 14. The gauge comprises a gauge face 20 of generally circular form. An indicator in the form of a needle 22 has one end pivotally mounted at the center of the face 20 so that it extends radially along the face and can sweep circumferentially along the face. The needle 22 is operatively connected to the pressure in line 18 via a tap 24 and a pressure sensitive device such as a Bourdon tube (not shown) so that its movements are a function of the pressure in line 18. The needle could be replaced by other types of indicator means such as a plurality of radial lines marked on the face 20 and a small pointer which sweeps circumferentially around the inner ends of the radial lines. However, it can be seen that, in either case, at least a part of the indicator means extends along the face 20 in a first direction (radially), and at least a part of the indicator means moves along the face 20 in a second direction (circumferentially) transverse to the first. In the embodiment shown, the extending and movable parts are one and same, i.e. the needle 22.

It should be understood that, while the system of FIG. 1 involves a centrifugal pump, the various gauges illustrated in the drawings can be used with virtually any fluid handling system containing fluid having a fluid head, either static or dynamic. Furthermore, by varying the parameters associated with the various parts of the gauge, the gauges can also be used with other types of systems involving three functionally related parameters.

Figure 2:
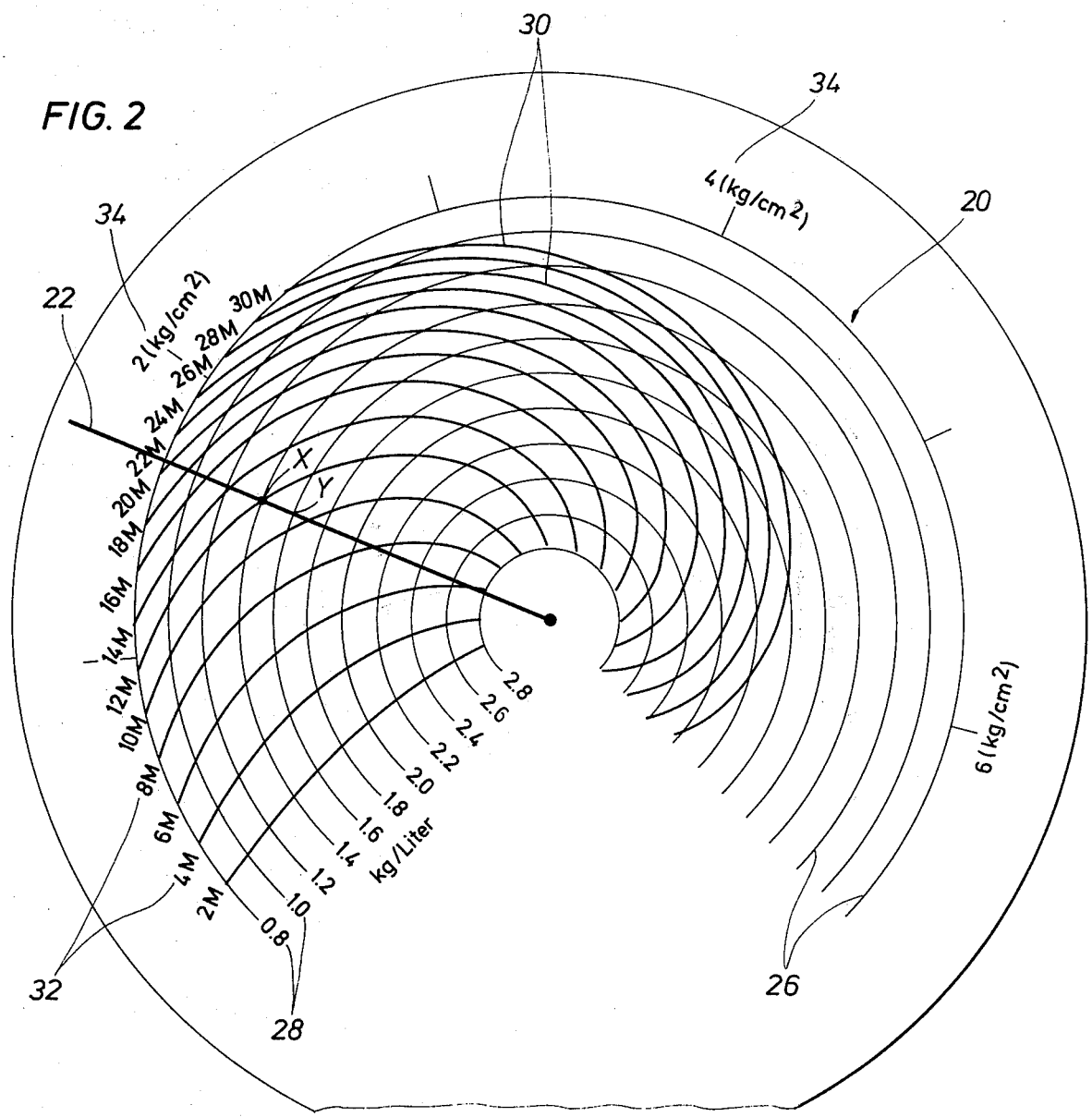
FIG. 2 is an enlarged elevational view of the gauge face and indicator of FIG. 1.

Referring now to FIG. 2, the gauge face 20 is shown in greater detail. The gauge face includes a first scale comprising a series of parallel aligned 330° circular arcs 26. Each of the arcs 26 corresponds to a given value of fluid density, and these values are indicated, in kilograms per liter or other suitable units, at 28 on the gauge face 20 adjacent the end points of their respective arcs 26. For convenience, the first scale is arranged so that the maximum fluid density value corresponds to the innermost arc 26 and the minimum fluid density value corresponds to the outermost arc 26. However, it will be appreciated that this arrangement can be reversed.

The gauge further comprises a second scale comprising a series of spiral arcs 30 each crossing a plurality of the circular arcs 26.

It can be seen that, while each individual arc 26 extends circumferentially along the face 20, the series of arcs 26 as a whole progresses along the face 20 in a radial direction. The series of arcs also progresses longitudinally along the needle 22. The spiral arcs 30 each extend in a partially radial and partially circumferential direction along the face 20. Thus each arc 30 extends angularly with respect to the direction (radially) in which needle 22 extends along face 20 as well as to the direction (circumferentially) in which needle 22 moves.

Each of the arcs 30 corresponds to a given value of the fluid head generated by the pump 10. These values, in meters or other suitable units, are marked on the gauge face 20 at 32 at the outer ends of their respective arcs 30. The curvature, disposition, and corresponding values of arcs 30 are determined by the functional relationship between fluid density, pressure, and fluid head either empirically or by the use of established formulae. Each of the arcs 30 has a changing radius of curvature which is least near the innermost one of the arcs 26 and increases outwardly. The arc 30 at the lower left is relatively short, shallow, and, in general, has a substantial radial component of direction. This arc represents the lowest fluid head value of the scale. Moving clockwise, the arcs represent successively larger fluid head values and become longer and more deeply curved. The major part of the arc 30 representing the greatest fluid head value has a substantial circumferential component of direction. It will be understood that these curvatures and/or dispositions would be suitably changed for other types of systems involving parameters other than fluid density, fluid head, and pressure. It will also be understood that the first scale could be made to correspond to a function of fluid density, such as specific gravity, ln fluid density, or a polynomial of fluid density, rather than to the density itself. Similarly, the second scale could be made to correspond to a function of fluid head. The curvature of the lines 30 would then change accordingly.

Regardless of the type system involved, the functions could not be chosen so that the arcs 30 would become straight radial lines where the straight radially extending needle 22 is used as the indicator as this would effectively eliminate the necessary third parameter. However, the arcs 30 might become straight generally radial lines if a curved indicator needle were used if each such line extended angularly with respect to the direction (partial radial - partial circumferential) of extent of the needle as well as the direction (circumferential) of movement of the needle. As will be explained more fully below, if the lines of the first series are parallel to each other and to the direction of movement of the indicator, they can be replaced by a series of dots. As used herein, the term "line" will refer to either a continuous or unbroken line or to a broken, e.g. dashed or dotted, line which provides sufficient points to indicate the general configuration and disposition of the line in question.

It can be seen that if the density of the liquid being pumped is known, the fluid head can be determined. For example, suppose needle 22 is in the position shown in FIG. 2, and the fluid density is known to be 1.4 kg/l. The arc 26 corresponding to the value 1.4 is first located. Then the point $x$ at which this arc 26 intersects the needle 22 is located. It can be seen that, at x, needle 22 also intersects the arc 30 corresponding to the fluid head value 10m. If the fluid density is 1.6kg/1, it can be seen that the needle crosses the arc 26 corresponding to the fluid density value at point y approximately half way between the arc 30 corresponding to 8m and the arc 30 corresponding to 10m. Thus the fluid head can be approximated at 9m although the increments between the values for arcs 30 are preferably small enough that it is usually sufficient to simply determine that it lies somewhere between the arcs 30 corresponding to 8m and 10m.

The gauge can thus be used to determine fluid head at any time. In many systems involving centrifugal pumps, performance is best if the fluid head is maintained at a given optimum value. In initially putting the system into operation, the gauge may be referred to and suitable adjustments made in the pump 10, etc. until this optimum value is obtained. Thereafter, if the fluid density changes, the pressure should change accordingly so that the head remains constant. By reference to the gauge, the operator will know that the proper fluid head value is being maintained even though the pressure has changed. Thus errors due to misconceptions are virtually eliminated. Furthermore, if due to wearing of various parts of the system or other problems, the head value should change, the change can be readily detected and appropriate steps taken to return it to its optimum value.

It can be seen that the gauge could also be used to determine fluid density if the fluid head are known. Furthermore, the gauge face could, if desired, be modified so that the circular arcs represented the various values for the fluid head and the spiral arcs represented the fluid density values. The gauge face 20 has several pressure values 34 marked in kg/cm² or other suitable units. The outer end of needle 22 extends radially beyond the outermost of the circular arcs 26 and the values 34 are arranged circumferentially around the gauge face at the outer end of the needle 22. The values 34 represent only a few checkpoints which may be used to determine whether or not the pressure sensitive portion of the apparatus is functioning properly. The number of such checkpoints is usually minimized so that the workers can not readily obtain a pressure reading from the gauge. This eliminates confusion between pressure and fluid head by forcing the workers to refer to the fluid head values. However, in some instances it may be desirable to provide a more complete scale of pressure values.

Figure 3:
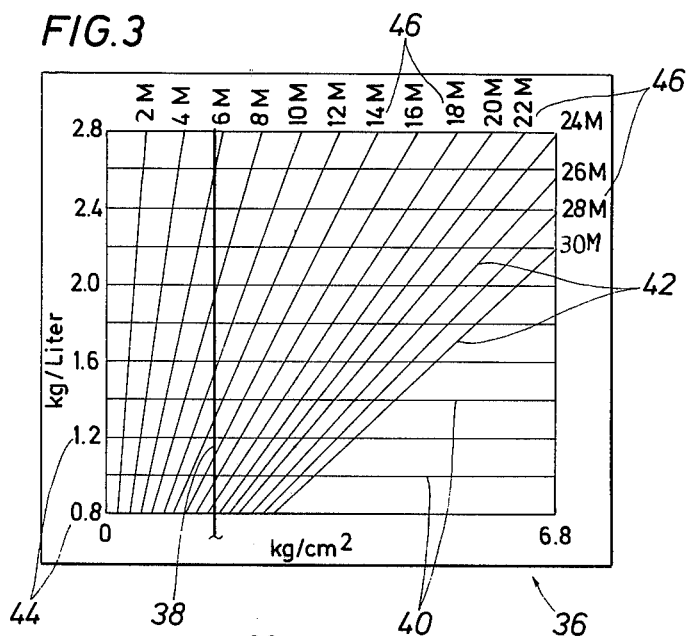
FIG. 3 is an elevational view of the gauge face and indicator of a second embodiment of gauge means.

Referring now to FIG. 3, there is shown a second form a gauge face 36 and cooperating indicator 38. The gauge face is generally rectangular and has a first scale thereon comprising a series of straight parallel lines 40. Each line 40 extends horizontally across the gauge face 36 so that the series of lines 40 as a whole progresses vertically along the face 36 and longitudinally along the vertical indicator 38. The second scale comprises a second series of lines 42 in the form of rays emanating from a point off the gauge face and each extending diagonally along the face 36 with a positive slope.

Each of the lines 40 corresponds to a given value of fluid density, and these values are marked on the gauge face 36 at 44 along the left edge of the face 36 at the left ends of the lines 40. Each of the lines 42 corresponds to a given value of fluid head, and these values are marked on the gauge face 36 at 46 at the upper ends of the lines 42 along the upper and right edges of the face 36. As in the embodiment of FIGS. 1 and 2, the scales could be reversed so that the lines 40 would correspond to the fluid head values and the lines 42 would correspond to the fluid density values. Also, suitable functions of fluid density and/or fluid head could be used in place of fluid density and fluid head per se.

The indicator 38 is in the form of a straight vertical needle extending generally perpendicularly across the lines 40. Needle 38 is mounted in any suitable manner, such as that to be described in connection with FIG. 6 below, so that it moves horizontally across the face 36 in response to the pressure in line 18 of the system.

It can be seen that, with the needle 38 in the position shown, if the fluid density is known to be 1.8 kg/1, the fluid head is between 8m and 10m or approximately 9m.

Figure 4:
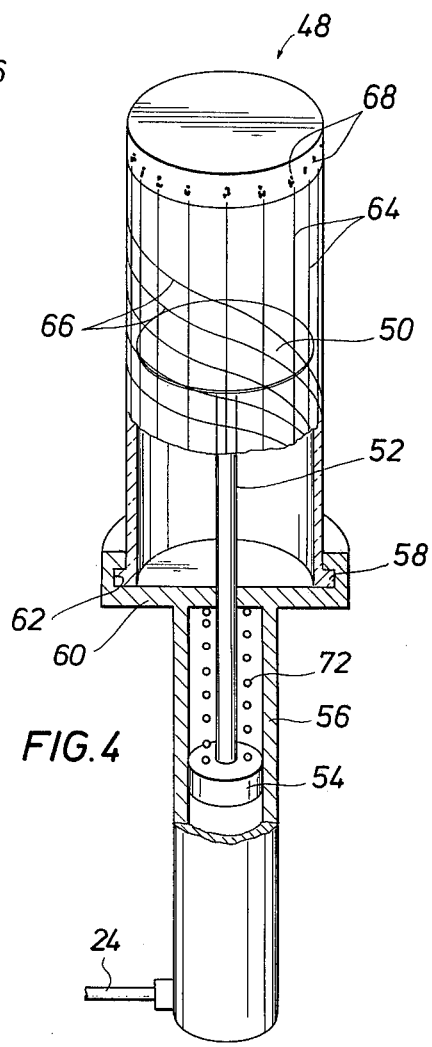
FIG. 4 is a perspective view of a third embodiment of gauge means.
Figure 5:
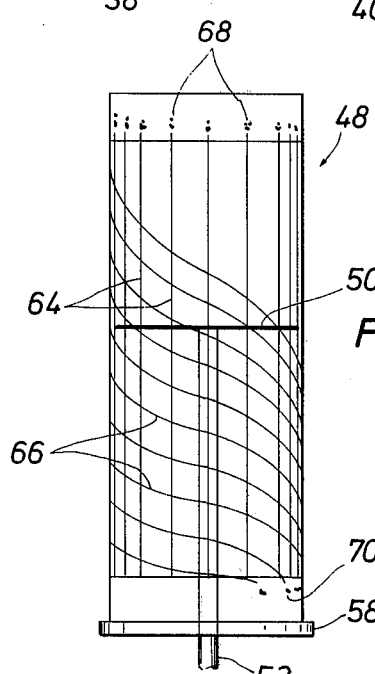
FIG. 5 is a partial elevational view of the gauge face and indicator of FIG. 4.

FIGS. 4 and 5 show a third form of gauge means in which the gauge face 48 is in the form of a transparent hollow cylinder. The indicator comprises a slender disc 50, coaxial with the gauge face 48, mounted on the end of a piston rod 52 for reciprocation longitudinally within the cylindrical gauge face 48. A piston 54 on the other end of rod 52 is slidably mounted in a cylinder 56. Gauge face 48 has a radial flange 58 at its lower end. A bracket 60 at the upper end of the cylinder 56 forms a mating annular channel 62 which receives the flange 58 in a sliding fit. Thus the gauge face 48 can be rotated about its own axis to bring the proper part of the gauge face into the operator's view.

The first scale comprises a series of parallel lines 64 parallel to the axis of the cylindrical gauge face 48. The second scale comprises a series of lines 66 slanted to extend longitudinally and circumferentially along the gauge face 48. The orientation of lines 66 with respect to lines 64 is similar to that of lines 42 with respect to lines 40 in the embodiment of FIG. 3. In other words, if the cylindrical gauge face 74 were spread open to form a rectangle, it would be seen that the lines 66 form rays emanating from a common point. Discs 50 forms a circular line which intersects the lines 64 at right angles. The edge of disc 50 is thus the part of the indicator which extends along the gauge face and also moves along the gauge face. It can be seen that the lines 64 progress longitudinally along the edge of disc 50 and that the lines 66 are each disposed angularly with respect to the edge of disc 50 as well as to its direction of motion.

Lines 64 extend into the upper end portion of the gauge face 48 where the corresponding values of fluid density are marked at 68. Lines 66 extend into the lower end portion of the gauge face 48 where their corresponding fluid head values are marked at 70.

A compression coil spring 72 is disposed between the upper side of piston 54 and the upper end of cylinder 56 to bias the piston 54 and attached disc 50 downwardly. Tap 24 from line 18 communicates with the lower end of the cylinder 56 below piston 54 so that the piston and attached disc 50 can be moved upwardly in response to the pressure in line 18. The gauge is read by following the line 64 corresponding to the known fluid density to the point at which it intersects the disc 50. The line 66 closest to this point then indicates the approximate fluid head.

Figure 6:
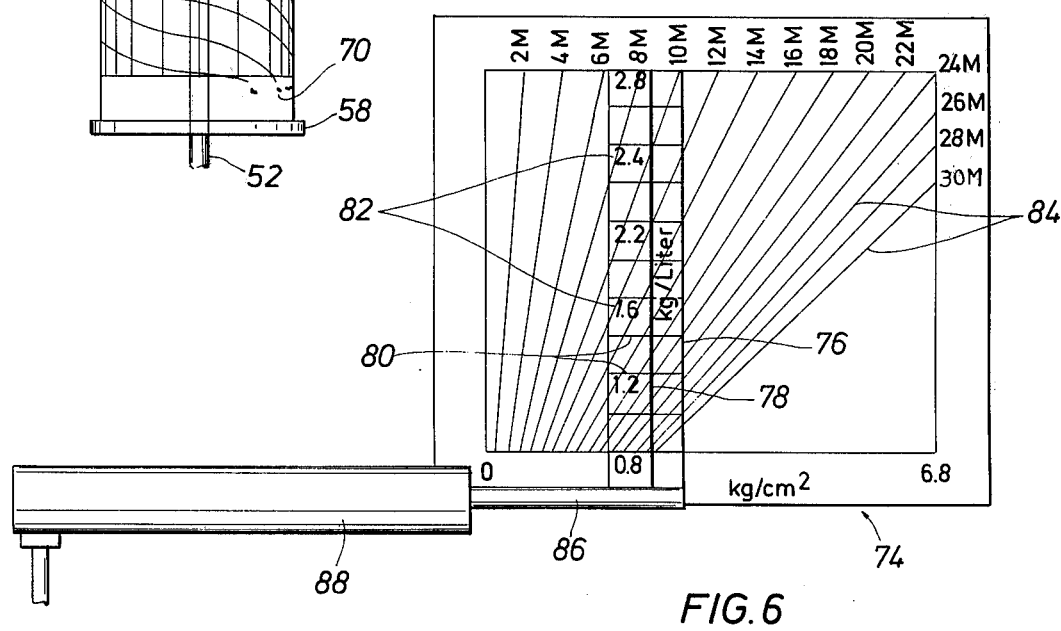
FIG. 6 is an elevational view of a fourth embodiment of gauge means.

FIG. 6 shows still another embodiment of the gauge means which is very much like the embodiment of FIG. 3 except that one of the scales is carried by the indicator means. The gauge face 74 is generally rectangular.

The indicator comprises a transparent slide 76 extending vertically along the gauge face 74 and having a vertical hairline 78. The slide 76 also has a scale comprising a plurality of horizontal lines 80 which progress vertically across the gauge face 74 as well as longitudinally along the hairline 78. Each line 80 corresponds to a given fluid density value and these values are marked on the slide 76 at 82 adjacent their respective lines 80.

The second scale comprises a plurality of diagonal lines or rays 84 on the gauge face 74. The lines 84 correspond to respective fluid head values and are substantially identical to lines 42 of FIG. 3.

The slide 76 is mounted on the end of a piston rod 86 extending from one end of a cylinder 88. Tap 24 communicates with the other end of the cylinder 88 to move the piston (not shown) together with rod 86 and slide 76 horizontally in response to the pressure in line 18. The piston may be biased toward the left by a spring similar to that of FIG. 4.

The gauge of FIG. 6 is read in much the same manner as in the other embodiments.

The embodiment of FIG. 6 illustrates one manner in which one of the scales can be carried by the movable part of the indicator rather than being marked directly on the gauge face. It will be noted that in each of the other embodiments, the lines of the first scale are parallel to each other and to the direction of movement of the indicator and progress longitudinally along the indicator as well as across the gauge face. Thus in each of these other embodiments, the first scale could be placed in the form of a series of shorter parallel lines marked on the movable part of the indicator. Furthermore, the lines of the first scale in each embodiment, whether marked on the gauge face of the movable part of the indicator, need not be marked in the form of lines. Rather, each line could be modified to be a single dot.

Numerous other modifications can be made in the preferred embodiments described above. It is thus intended that the invention be limited only by the claims which follow.

I claim:

1. In a fluid handling apparatus containing a fluid having a fluid head, gauge means comprising:
   gauge face means;
   pressure sensitive indicator means disposed adjacent said face means, at least a part of said indicator means extending along said face means in a first direction, and at least a part of said indicator means being movable along said face means in a second direction generally transverse to said first direction, said movable part of said indicator means being operably exposed to the pressure in said fluid directing means to be moved in accordance with said pressure;
   a first scale comprising a first series of indicia marks on one of said gauge face means or said indicator means, said marks progressing longitudinally along said extending part of said indicator means in said first direction and each mark of said first series corresponding to a given value of a first parameter; and
   a second scale comprising a second series of indicia lines on said gauge face means, each line of said second series extending along said face means angularly with respect to said first and second directions and each line of said second series corresponding to a given value of a second parameter; wherein one of said parameters is a function of the density values of said fluid and the other of said parameters is a function of the valve of said fluid head, and wherein said lines of said second series are configured and disposed with respect to said indicator means and said marks of said first series to reflect the relationship between said pressure, the density of said fluid, and said fluid head to provide an indication of one of said values in accordance with the other of said values and said pressure by movement of the movable part of the indicator means with respect to the second scale.

2. The system of claim 1 wherein said fluid handling apparatus comprises a centrifugal pump and wherein said movable part of said indicator means is connected to the outlet end of said pump.

3. The system of claim 1 wherein said first series of marks forms a first series of non-crossing lines, wherein said second series of lines are also non-crossing, each line of said second series intersecting a plurality of the lines of said first series, and wherein said extending part of said indicator means comprises means forming a line intersecting the lines of said first series at angles differing from the angles at which the lines of said second series intersect the lines of said first series.

4. The system of claim 1 wherein said extending and movable parts of said indicator means are each composed of said indicator means at a whole, and wherein said first series of marks are disposed on said indicator means.

5. The system of claim 1 wherein said first series of marks are disposed on said face means.

6. The system of claim 5 wherein said first series of marks comprises a plurality of concentric circular arcs, wherein said second series of lines comprises a plurality of non-crossing spiral arcs each extending radially and circumferentially across at least some of said circular arcs, and wherein said movable part of said indicator means is pivoted at the center of said circular arcs for circumferential movement with respect to said circular arcs.

7. The system of claim 6 wherein said extending and movable parts of said indicator means are each comprised of said indicator means as a whole, said indicator means extending radially outwardly from said center to the outermost one of said circular arcs.

8. The system of claim 6 wherein said second parameter is fluid head.

9. The system of claim 8 wherein said first parameter is fluid density.

10. The system of claim 9 wherein said first scale has its radially innermost arc corresponding to a maximum density value and its radially outermost arc corresponding to a minimum density value.

11. The system of claim 5 wherein said first series of marks comprises a plurality of parallel lines, wherein said second series of lines comprises a plurality of rays each intersecting at least some of said lines of said first series, and wherein said indicator means comprises an elongate member extending across all the lines of said first series and movable along said lines of said first series generally parallel to said lines of said first series.

12. The system of claim 11 wherein said indicator means comprises an elongate member perpendicular to said lines of said first series.

13. The system of claim 5 wherein said face means comprises a cylindrical member, wherein said first series of marks comprises a plurality of parallel lines extending longitudinally along said cylindrical member, wherein said lines of said second series each extend longitudinally and circumferentially along said cylindrical member intersecting at least some of said lines of said first series, and wherein said movable part of said indicator means is movable longitudinally along said cylindrical member.

14. The system of claim 13 wherein said movable part of said indicator means is disposed inside said cylindrical member, said cylindrical member being transparent.

15. The system of claim 14 wherein said cylindrical member is mounted for rotation about its own axis.

16. The system of claim 1 wherein said one of said parameters is fluid density.

17. The system of claim 1 wherein said other of said parameters is fluid head.

* * * * *

UNITED STATES PATENT AND TRADEMARK OFFICE
CERTIFICATE OF CORRECTION

PATENT NO. : 4,023,416
DATED : May 17, 1977
INVENTOR(S) : George Ormsby

It is certified that error appears in the above-identified patent and that said Letters Patent are hereby corrected as shown below:

In Column 2, line 30, delete the word "The" and insert therefor --This--.

In Column 4, line 50, after the word "used" insert --and--.

In Column 8, line 3, delete the word "valve" and insert therefor --value--.

In Column 8, line 11, after the word "by" insert --the--.

Signed and Sealed this

Twenty-fifth Day of October 1977

[SEAL]

Attest:

RUTH C. MASON
Attesting Officer

LUTRELLE F. PARKER
Acting Commissioner of Patents and Trademark